United States Patent
Magai et al.

(10) Patent No.: US 8,000,494 B2
(45) Date of Patent: Aug. 16, 2011

(54) DIGITAL WATERMARK DETECTING DEVICE

(75) Inventors: Koichi Magai, Tokyo (JP); Hiroshi Ito, Tokyo (JP); Ryousuke Fujii, Tokyo (JP); Mitsuyoshi Suzuki, Tokyo (JP); Kohtaro Asai, Tokyo (JP); Tokumichi Murakami, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 744 days.

(21) Appl. No.: 12/066,772

(22) PCT Filed: Sep. 27, 2006

(86) PCT No.: PCT/JP2006/319139
§ 371 (c)(1),
(2), (4) Date: Mar. 13, 2008

(87) PCT Pub. No.: WO2007/040111
PCT Pub. Date: Apr. 12, 2007

(65) Prior Publication Data
US 2009/0136084 A1    May 28, 2009

(30) Foreign Application Priority Data
Oct. 3, 2005   (JP) ................. 2005-289864

(51) Int. Cl.
*G06K 9/00* (2006.01)
(52) U.S. Cl. ......... 382/100; 382/181; 713/176; 380/203
(58) Field of Classification Search .................. 382/100, 382/181; 380/203; 713/176
See application file for complete search history.

(56) References Cited

U.S. PATENT DOCUMENTS

| | | | |
|---|---|---|---|
| 6,334,721 B1 * | 1/2002 | Horigane | 400/76 |
| 6,873,711 B1 * | 3/2005 | Murakami et al. | 382/100 |
| 7,142,689 B2 * | 11/2006 | Hayashi et al. | 382/100 |
| 7,286,819 B2 * | 10/2007 | Isshiki | 455/414.4 |
| 7,515,732 B2 * | 4/2009 | Fan et al. | 382/100 |

FOREIGN PATENT DOCUMENTS

| | | |
|---|---|---|
| JP | 2001 119558 | 4/2001 |
| JP | 2001 525153 | 12/2001 |
| JP | 2002 190945 | 7/2002 |

\* cited by examiner

*Primary Examiner* — Bhavesh M Mehta
*Assistant Examiner* — Stephen R Koziol
(74) *Attorney, Agent, or Firm* — Oblon, Spivak, McClelland, Maier & Neustadt, L.L.P.

(57) ABSTRACT

A digital watermark detecting device includes an extracting unit to extract pixels embedded as a digital watermark from an input image and to output an extracted pixel value row, a generating unit to generate a set of orthogonal patterns, a detecting unit to calculate a correlation using an integration result of the orthogonal patterns and the extracted pixel value row, to determine detected values corresponding to the orthogonal patterns and a standard deviation for detected values excluding a maximum detected value with a maximum absolute value from the calculated detected values, to calculate a quotient by dividing the maximum detected value by the standard deviation, a discriminating unit to output information corresponding to the result of comparison between a threshold parameter and the quotient, and a unit to convert the detected value inputted from the detecting unit into predetermined information, when the reliability of the detected values satisfies a standard.

4 Claims, 1 Drawing Sheet

DIGITAL WATERMARK DETECTING DEVICE

TECHNICAL FIELD

The present invention relates to a digital watermark detecting device for detecting a digital watermark from an input image, and more particularly, to improvement of accuracy of reliability judgment for detected information.

BACKGROUND ART

As a conventional reliability estimation method for detected information, there is a method of preparing a digital watermark signal orthogonal to a two-dimensionally embedded digital watermark signal (a first pattern array) as a second pattern array, calculating, with a detected value detected using this second pattern array as a reference, a distance between the detected value and a detected value detected by using the first pattern as a "reliability distance", and statistically verifying the reliability distance to thereby judge reliability of detected information (see, for example, Patent Document 1).

Patent Document 1: JP 2001-119558 A

DISCLOSURE OF THE INVENTION

Problem to be Solved by the Invention

In the conventional detected information reliability estimation method disclosed in Patent Document 1, it is assumed that a distribution of a detected value detected by using the second pattern array is equivalent to a distribution of a detected value detected in a state in which a digital watermark is not embedded. However, depending on an image, it is likely that there is a correlation between an image signal and the second pattern array. In such a case, there is a problem in that the assumption does not hold and accuracy of reliability judgment for detected information is deteriorated.

The present invention has been devised in order to solve the problem described above and it is an object of the present invention to obtain a digital watermark detecting device that can improve accuracy of reliability judgment for detected information and prevent misdetection.

Means for Solving the Problem

A digital watermark detecting device according to the present invention includes: a digital-watermark-detection-target-pixel extracting unit for extracting pixels embedded as a digital watermark from an input image and outputting an extracted pixel value row; an orthogonal-pattern generating unit for generating all orthogonal patterns belonging to a set of patterns orthogonal to one another; an integrating unit for integrating each of the orthogonal patterns generated by the orthogonal-pattern generating unit and the extracted pixel value row from the digital-watermark-detection-target-pixel extracting unit; a digital-watermark detecting unit for calculating a correlation using a result of the integration by the integrating unit of each of the orthogonal patterns and the extracted pixel value row, calculating detected values corresponding to the respective orthogonal patterns, calculating a standard deviation for detected values obtained by excluding a maximum detected value with a maximum absolute value from the calculated respective detected values, calculating a reliability discrimination parameter value given as a quotient obtained by dividing the maximum detected value by the calculated standard deviation, and outputting the maximum detected value and the reliability discrimination parameter value; a detected-information-reliability discriminating unit for comparing a set threshold parameter and the reliability discrimination parameter value from the digital-watermark detecting unit and outputting the maximum detected value and information concerning reliability of the detected values corresponding to a result of the comparison; and a detected-information converting unit for converting, when information indicating that reliability of the detected values satisfies a standard is received from the digital-watermark detecting unit on the basis of the information from the detected-information-reliability discriminating unit, the detected values inputted from the digital-watermark detecting unit into information decided in advance and outputting the information as detected information.

Effect of the Invention

According to the present invention, a detected value is calculated by using all patterns orthogonal to an embedded digital watermark signal pattern, a standard deviation is calculated from a distribution of the detected value, the quotient obtained by dividing a detected value, which is detected by using the embedded digital watermark signal, by the standard deviation can be set as a reliability discrimination parameter for the detected value. Therefore, it is possible to improve accuracy of reliability judgment for detected information and prevent misdetection.

BEST MODE FOR CARRYING OUT THE INVENTION

First Embodiment

Figure 1:
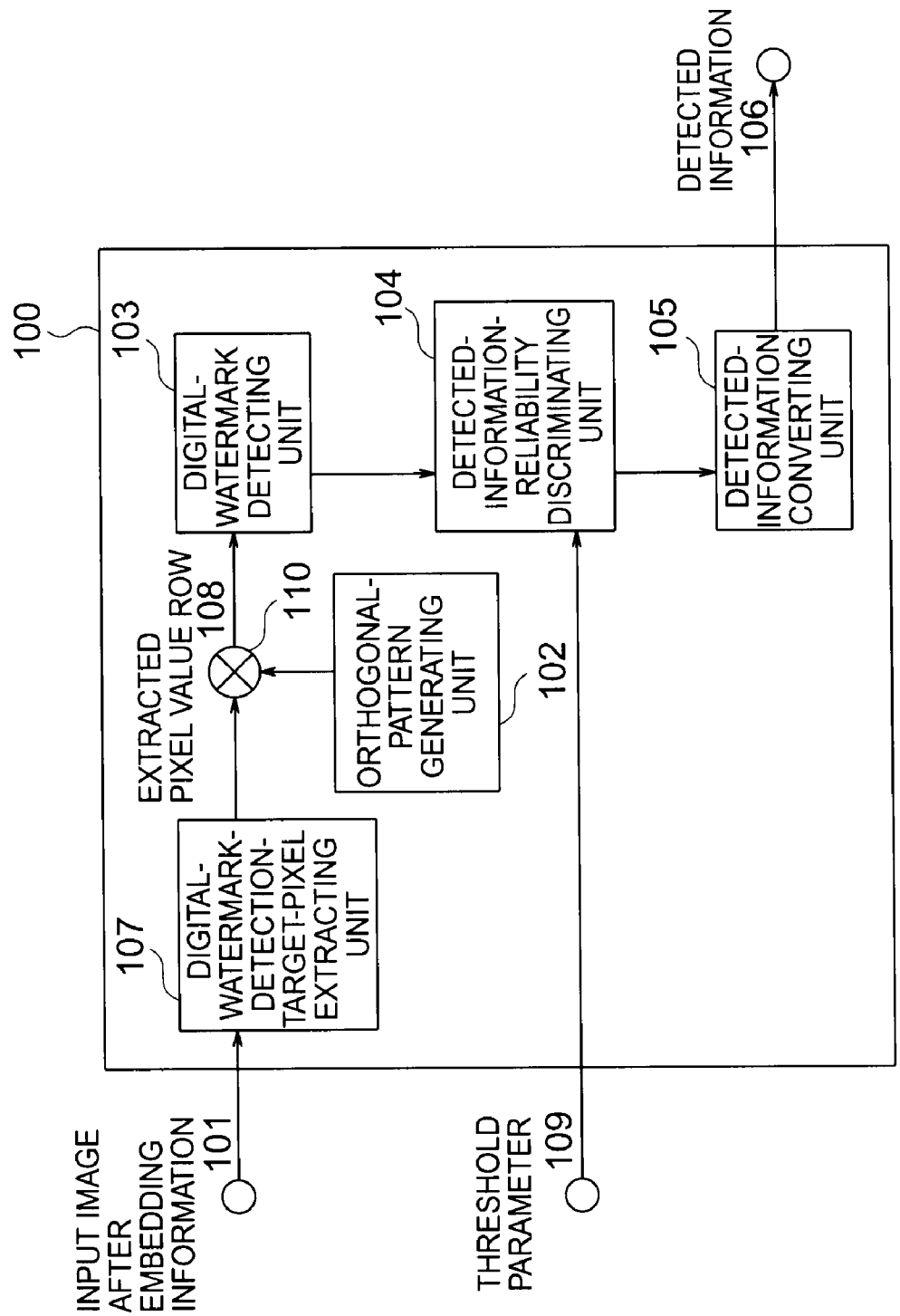
FIG. 1 is a block diagram showing the structure of a digital watermark detecting device according to a first embodiment of the present invention.

It is difficult to perfectly prevent misdetection in detection of a digital watermark. In order to further reduce a misdetection ratio, a method of using an error correction code is conceivable. However, in this method, it is necessary to insert, other than information originally desired to be inserted, a code for performing detection and correction of an error. New problems such as deterioration in an image quality more than necessary and limitation on an amount of actual information occur. Therefore, evaluation of reliability of detected bit information is considered. If appropriate evaluation can be carried out, it is possible to prevent misdetection by not outputting detected information with low reliability.

In the present invention, diffusion patterns orthogonal to one another are embedded as digital watermarks and, in detecting the digital watermarks, a calculation result of a correlation with plural orthogonal patterns is used. In this case, a correlation value is the highest when orthogonal patterns are the same as those at the time of embedding. When orthogonal patterns other than the orthogonal patterns are applied, a correlation value is a value close to 0.

In the calculation of a correlation in the first embodiment, pixel values are extracted from embedding positions allocated to an image at random and a correlation with orthogonal patterns is calculated. In this case, it can be expected that a correlation value v in the case in which the orthogonal patterns do not coincide with those at the time of embedding conforms to a normal distribution with an average 0 and dispersion $\sigma^2$ according to the central limit theorem.

Therefore, at the time of correlation calculation, as a method of comparing a correlation value obtained when the orthogonal patterns coincide with those at the time of embedding and a correlation value obtained when the orthogonal patterns do not coincide with those at the time of embedding, an average μ and a standard deviation σ are calculated from n correlation values obtained when the orthogonal patterns do not coincide with those at the time of embedding and the comparison is performed according to how many times the correlation value obtained at the time when the orthogonal patterns coincide with those at the time of embedding is as large as σ.

In other words, when the correlation value obtained when the orthogonal patterns coincide with those at the time of embedding is $V_{meet}$ and the n correlation values obtained when the orthogonal patterns do not coincide with those at the time of embedding are $v_1, v_2, \ldots, v_n$, the average μ and the standard deviation σ are calculated as described below, respectively.

$$\mu = \frac{1}{n}\sum_{i=1}^{n} v_i$$ [Equation 1]

$$\sigma = \sqrt{\sigma^2}$$

$$= \sqrt{\frac{1}{n}\sum_{i=1}^{n}(v_i - \mu)^2}$$

In this case, a check on how many times the correlation value obtained when the orthogonal patterns coincide with those at the time of embedding is as large as σ is performed by calculating a value described below.

$$k_0 = \frac{|V_{meet} - \mu|}{\sigma}$$ [Equation 2]

FIG. 1 is a block diagram showing the structure of a digital watermark detecting device according to the first embodiment of the present invention.

A digital watermark detecting device 100 according to the first embodiment shown in FIG. 1 includes a digital-watermark-detection-target-pixel extracting unit 107 for specifying and extracting pixels embedded as a digital watermark from an input image after embedding information 101, which is a digital watermark detection target, and outputting the pixels as an extracted pixel value row 108, an orthogonal-pattern generating unit 102 for generating all orthogonal patterns belonging to a set of patterns orthogonal to one another used at the time of embedding, an integrating unit 110 for integrating each of the orthogonal patterns generated by the orthogonal-pattern generating unit 102 and the extracted pixel value row 108 from the digital-watermark-detection-target-pixel extracting unit 107, a digital-watermark detecting unit 103 for calculating detected values corresponding to the respective orthogonal patterns by calculating a correlation using a result of the integration by the integrating unit 110, calculating a standard deviation for detected values obtained by excluding a detected value with a maximum absolute value (a maximum detected value) from the calculated respective detected values, calculating a reliability discrimination parameter value given as the quotient obtained by dividing the maximum detection value by the calculated standard deviation, and outputting the maximum detected value and the reliability discrimination parameter value, a detected-information-reliability discriminating unit 104 for comparing a set threshold parameter 109 and the reliability discrimination parameter value from the digital-watermark detecting unit 103 and outputting the maximum detected value and information concerning reliability of the detected values corresponding to a result of the comparison, and a detected-information converting unit 105 for converting, when information indicating that reliability of the detected values satisfies a standard is received from the digital-watermark detecting unit 103 on the basis of the information from the detected-information-reliability discriminating unit 104, the detected values inputted from the digital-watermark detecting unit 103 into information decided in advance and outputting the information as detected information 106, and outputting nothing when the information indicating that reliability of the detected values does not satisfy the standard is received from the digital-watermark detecting unit 103.

Next, operations of the digital watermark detecting device according to the constitution described above for detecting the embedded digital watermark as described above are explained.

Before carrying out detection processing, a detector sets the threshold parameter 109 in the detected-information-reliability discriminating unit 104.

In the detection processing, first, the detector inputs the input image after embedding information 101, which is a detection target of digital watermark information, to the digital watermark detecting device 100. The digital-watermark-detection-target-pixel extracting unit 107 specifies and extracts pixels embedded as a digital watermark from the input image after embedding information 101 and outputs the pixels as the extracted pixel value row 108.

The orthogonal-pattern generating unit 102 generates all orthogonal patterns belonging to a set of patterns orthogonal to one another used at the time of embedding. The integrating unit 110 integrates each of the orthogonal patterns generated by the orthogonal-pattern generating unit 102 and the extracted pixel value row 108 from the digital-watermark-detection-target-pixel extracting unit 107 and inputs a result of the integration to the digital-watermark detecting unit 103.

First, the digital-watermark detecting unit 103 calculates detected values corresponding to the respective orthogonal patterns by calculating a correlation using a result of the integration of each of the inputted generated orthogonal patterns and the extracted pixel value row 108. Next, the digital-watermark detecting unit 103 calculates a standard deviation for detected values obtained by excluding a detected value with a maximum absolute value (a maximum detected value) from the calculated respective detected values. The digital-watermark detecting unit 103 calculates, as a reliability discrimination parameter value, the quotient by dividing the maximum detection value by the calculated standard deviation. Finally, the digital-watermark detecting unit 103 passes the maximum detected value and the reliability discrimination parameter value to the detected-information-reliability discriminating unit 104.

The detected-information-reliability discriminating unit 104 compares the threshold parameter 109 set by the detector and the reliability discrimination parameter value inputted from the digital-watermark detecting unit 103 and passes, when the reliability discrimination parameter value is equal to or larger than the threshold parameter 109, the maximum detected value inputted from the digital-watermark detecting unit 103 and information indicating that reliability of the detected values satisfies the standard to the detected-information converting unit 105. On the other hand, when the reliability discrimination parameter value is smaller than the threshold parameter 109, the detected-information-reliability discriminating unit 104 passes the maximum detected value inputted from the digital-watermark detecting unit 103 and information indicating that reliability of the detected values does not satisfy the standard to the detected-information converting unit 105.

The detected-information converting unit 105 converts, when the information indicating that reliability of the detected values satisfies the standard is received from the digital-watermark detecting unit 103, the detected values inputted from the digital-watermark detecting unit 103 into information decided in advance and outputs the information as detected information 106. Conversely, when the information indicating that reliability of the detected values does not satisfy the standard is received from the digital-watermark detecting unit 103, the detected-information converting unit 105 outputs nothing.

By constituting the digital watermark detecting device as described above, a detected value is calculated using all patterns orthogonal to an embedded digital watermark signal pattern, a standard deviation is calculated from a distribution of the detected value, when the quotient obtained by dividing a detected value detected by using the embedded digital watermark signal by the standard deviation is k, this k can be set as a reliability discrimination parameter, and when the parameter k is smaller than a threshold decided in advance, detected information is not outputted judging that reliability of the detected information is insufficient. This makes it possible to improve accuracy of reliability judgment for the detected information and prevent misdetection.

In the above explanation, when information indicating that reliability of a detected value from the digital-watermark detecting unit 103 does not satisfy the standard is received, the detected-information converting unit 105 outputs nothing. However, the detected-information converting unit 105 may convert a detected value inputted from the digital-watermark detecting unit 103 into information decided in advance, output the detected information 106, and simultaneously output information indicating that reliability of the output information is low.

In the above explanation, the orthogonal-pattern generating unit 102 generates all orthogonal patterns belonging to a set of patterns orthogonal to one another used at the time of embedding, integrates each of the generated orthogonal patterns and the extracted pixel value row 108, and inputs a result of the integration to the digital-watermark detecting unit 103. When orthogonal patterns likely to be embedded are specified, as orthogonal patterns to be integrated, in addition to the orthogonal patterns likely to be embedded, partial orthogonal patterns extracted fixedly or at random from all the orthogonal patterns belonging to the set of patterns orthogonal to one another used at the time of embedding may be used.

The invention claimed is:

1. A digital watermark detecting device, comprising:
   a digital-watermark-detection-target-pixel extracting unit to extract pixels embedded as a digital watermark from an input image and to output an extracted pixel value row;
   an orthogonal-pattern generating unit to generate a plurality of orthogonal patterns belonging to a set of patterns orthogonal to one another;
   an integrating unit to integrate each of the orthogonal patterns generated by the orthogonal-pattern generating unit and the extracted pixel value row from the digital-watermark-detection-target-pixel extracting unit;
   a digital-watermark detecting unit to calculate a correlation using a result of the integration by the integrating unit of each of the orthogonal patterns and the extracted pixel value row, to calculate detected values corresponding to the respective orthogonal patterns, to calculate a standard deviation of detected values obtained by excluding a maximum detected value with a maximum absolute value from the calculated respective detected values, to calculate a reliability discrimination parameter value given as a quotient obtained by dividing the maximum detected value by the calculated standard deviation, and to output the maximum detected value and the reliability discrimination parameter value;
   a detected-information-reliability discriminating unit to compare a set threshold parameter and the reliability discrimination parameter value from the digital-watermark detecting unit and to output the maximum detected value and information concerning reliability of the detected values corresponding to a result of the comparison; and
   a detected-information converting unit to convert, when information indicating that reliability of the detected values satisfies a standard is received from the digital-watermark detecting unit on the basis of the information from the detected-information-reliability discriminating unit, the detected values inputted from the digital-watermark detecting unit into information decided in advance and to output the information as detected information, wherein
   at least one of the above units is implemented in hardware or as a hardware and software combination.

2. The digital watermark detecting device according to claim 1, wherein the detected-information converting unit is configured to output nothing when the information indicating that reliability of the detected values does not satisfy the standard is received from the digital-watermark detecting unit.

3. A digital watermark detecting method, comprising:
   extracting pixels embedded as a digital watermark from an input image to obtain an extracted pixel value row;
   generating all orthogonal patterns belonging to a set of patterns orthogonal to one another;
   integrating each of the orthogonal patterns generated by the generating step and the extracted pixel value row from the extracting step;
   calculating a correlation using a result of the integration by the integrating step of each of the orthogonal patterns and the extracted pixel value row;
   calculating detected values corresponding to the respective orthogonal patterns;
   calculating a standard deviation of detected values obtained by excluding a maximum detected value with a maximum absolute value from the calculated respective detected values;
   calculating a reliability discrimination parameter value given as a quotient obtained by dividing the maximum detected value by the calculated standard deviation;
   comparing a set threshold parameter and the reliability discrimination parameter value to determine information concerning reliability of the detected values corresponding to a result of the comparison;
   converting, when the information indicating that reliability of the detected values satisfies a standard, the detected values into information decided in advance; and
   outputting the information as detected information.

4. The digital watermark detecting method according to claim 3, further comprising:
   outputting nothing when the information indicating that reliability of the detected values does not satisfy the standard.

* * * * *